US011606710B2

(12) United States Patent
Ramamirtham et al.

(10) Patent No.: US 11,606,710 B2
(45) Date of Patent: Mar. 14, 2023

(54) REDISTRIBUTION OF 802.11AX CAPABLE CLIENT DEVICES TO RADIOS TO IMPROVE THROUGHPUT AND SPECTRAL EFFICIENCY

(71) Applicant: HEWLETT PACKARD ENTERPRISE DEVELOPMENT LP, Houston, TX (US)

(72) Inventors: Sathya Narayanan Ramamirtham, Santa Clara, CA (US); Nethra Muniyappa, Santa Clara, CA (US); Rajarshi Bhattacharyya, Santa Clara, CA (US); Rishabh Gupta, Santa Clara, CA (US); Rajini Balay, Santa Clara, CA (US); Sree Harsha, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 58 days.

(21) Appl. No.: 17/223,998

(22) Filed: Apr. 6, 2021

(65) Prior Publication Data

US 2022/0322128 A1    Oct. 6, 2022

(51) Int. Cl.
*H04W 28/02*    (2009.01)
*H04W 88/10*    (2009.01)
(Continued)

(52) U.S. Cl.
CPC ... *H04W 28/0215* (2013.01); *H04W 28/0273* (2013.01); *H04W 28/20* (2013.01);
(Continued)

(58) Field of Classification Search
CPC . H04W 84/10; H04W 84/12; H04W 72/0406; H04W 72/0426; H04W 72/0433;
(Continued)

(56) References Cited

U.S. PATENT DOCUMENTS

2018/0279192 A1    9/2018    Raissinia et al.
2019/0281446 A1    9/2019    Shanbhag
(Continued)

FOREIGN PATENT DOCUMENTS

WO    WO-2020084498    4/2020

OTHER PUBLICATIONS

Cisco Meraki, Band Steering Overview, https://documentation.meraki.com/MR/Radio_Settings/Band_Steering_Overview, Website Accessed Oct. 29, 2020, 2 Pgs.
(Continued)

*Primary Examiner* — Peter Chen
(74) *Attorney, Agent, or Firm* — Sheppard Mullin Richter & Hampton LLP

(57) ABSTRACT

Systems and methods are provided for receiving data indicating a spatial distribution and 802.11ax capabilities of access point radios and of client devices in a network, assigning the access point radios as either first access point radios or second access point radios, the first access point radios conducting data transmission using an 802.11ax wireless standard and the second access point radios conducting data transmission using legacy wireless standards, based on the data, determining whether any of the client devices are to be steered to a different access point radio based on the 802.11ax capabilities of the client devices, and in response to determining that a client device is to be steered to a different access point radio, steering the client device to a first access point radio or a second access point radio.

16 Claims, 14 Drawing Sheets

(51) Int. Cl.
   *H04W 28/20* (2009.01)
   *H04W 72/04* (2009.01)
   *H04W 72/0453* (2023.01)

(52) U.S. Cl.
   CPC ... *H04W 72/0426* (2013.01); *H04W 72/0453* (2013.01); *H04W 88/10* (2013.01)

(58) Field of Classification Search
   CPC ............. H04W 72/042; H04W 72/044; H04W 72/0453; H04W 72/0413; H04W 8/22; H04W 8/24; H04W 88/02; H04W 88/06; H04W 88/08; H04W 88/10; H04W 28/0215; H04W 28/0273; H04W 28/18; H04W 28/20; H04W 16/28; H04W 92/16; H04W 92/18; H04W 92/20
   See application file for complete search history.

(56) References Cited

U.S. PATENT DOCUMENTS

2021/0014679 A1* 1/2021 Liu ...................... H04W 12/50
2021/0282063 A1* 9/2021 Khoury ................ H04W 48/12

OTHER PUBLICATIONS

Cisco, XOR Radio Support, https://www.cisco.eom/c/en/us/td/docs/wireless/controller/9800/config-guide/b_wl_16_10_cg/cisco-xor.pdf, Website Accessed Oct. 29, 2020, 6 Pgs.

* cited by examiner

REDISTRIBUTION OF 802.11AX CAPABLE CLIENT DEVICES TO RADIOS TO IMPROVE THROUGHPUT AND SPECTRAL EFFICIENCY

BACKGROUND

The proliferation of features on client devices, such as IEEE (Institute of Electrical and Electronic Engineers) 802.11ax, or Wi-Fi 6 capabilities, has brought on an increasing desire of connecting such client devices to networks in a manner that optimizes capabilities of such features. For example, a client device having 802.11ax capabilities should be connected to a radio of an access point that operates on a spectrum or channel having other client devices that support 802.11ax capabilities. In addition, legacy devices that lack 802.11ax capabilities should not be connected to the same spectrum or channel. Otherwise, the 802.11ax capabilities of client devices may be rendered inoperative or diminished.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
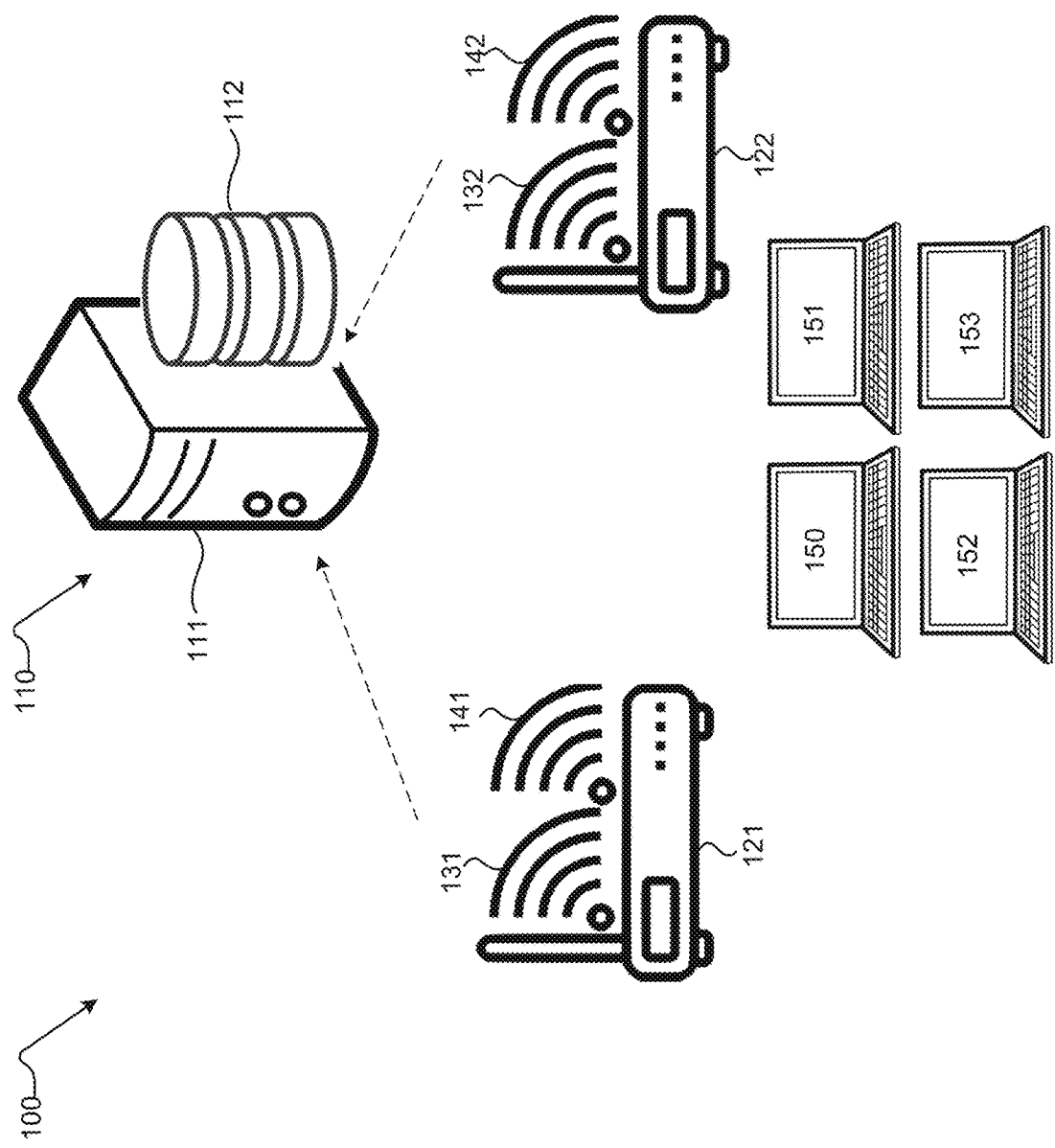
FIG. 1A is an exemplary illustration of a computing system that assesses a network environment, such as a wireless network environment, and reroutes or steers client devices to radios of access points to enhance the 802.11ax capabilities of the client devices, according to embodiments described in the present disclosure.

The figures are not exhaustive and do not limit the present disclosure to the precise form disclosed.

DETAILED DESCRIPTION

The development of a cornucopia of new features on client devices, such as IEEE 802.11ax features, has spurred a need to develop networks and mechanisms to connect to the networks in order to enable optimal utilization of such features. 802.11ax features include denser modulation using 1024 Quadrature Amplitude Modulation (QAM) which enables a more-than-35-percent speed burst, Orthogonal Frequency Division Multiple Access (OFDMA)-based scheduling to reduce overhead and latency, Multi-User (MU) Multiple-Input and Multiple-Output (MIMO) uplink and downlink transmission, and robust high-efficiency signaling which improves operation at a significantly lower Received Signal Strength Indication (RSS). These features may support additional clients in dense environments, more predictable performance for advanced applications such as 4K video, Ultra High Definition (HD), wireless office, and Internet of Things (IoT), and flexible wake-up time scheduling.

Currently, 802.11ax features of client devices may not be fully leveraged. In a network, some of the access points may not support 802.11ax features, or in other words, have 802.11ax capabilities. Thus, in order to fully leverage 802.11ax features, client devices supporting 802.11ax features should be connected to, and transmit and receive data using, 802.11ax supported access points. In particular, the supported client devices should associate to particular radios that support 802.11ax capabilities on the 802.11ax supported access points. Additionally, client devices supporting 802.11ax features (hereinafter "802.11ax supported client devices") should transmit and receive data on separate channels compared to client devices supporting only legacy wireless standards (hereinafter "legacy client devices") including 802.11a, 802.11b, 802.11g, 802.11n, or 802.11ac wireless standards without supporting 802.11ax features. If an 802.11ax supported client device communicated on a same channel as a legacy client device, the legacy client device would consume air time of that channel and may hinder 802.11ax operations such as multi-user grouping which would compromise performance of the 802.11ax features.

Embodiments described herein address these technical problems to increase, or optimize, performance of 802.11ax capabilities in a network having legacy client devices and non-802.11ax supported access points. Although the description primarily focuses on access points, the description may also be applicable to other network devices such as routers. Each access point or access point radio may be assigned, designated, or delegated either to conduct data transmission using the 802.11ax standard (hereinafter "802.11ax assigned access point radios") or to conduct data transmission using legacy wireless standards (hereinafter "non-802.11ax access point radios"). In some embodiments, whether an access point radio is 802.11ax assigned may indicate or correspond to a preference of that access point radio for legacy devices, for 802.11ax devices, or for any devices which include both legacy and 802.11ax devices. In particular, an access point radio that is 802.11ax capable may nonetheless be assigned as non-11ax, or legacy, preferred. The assignment may be based at least in part on a spatial distribution and/or 802.11ax capabilities of access points and/or client devices in a network. For example, if a number of 802.11ax supported client devices in the network is fewer, then fewer access point radios may be assigned or designated as 802.11ax radios that conduct data transmission using 802.11ax features. Moreover, access point radios residing on access points that lack 802.11ax capabilities should not be assigned to conduct data transmission for 802.11ax supported client devices since such access point radios would be incapable of doing so. Thus, the access point radios to be assigned to conduct data transmission using 802.11ax features should be selected from access points that have 802.11ax capabilities.

802.11ax assigned access point radios may be allocated to a first sub-band, or a first subset of channels, in a wireless spectrum, that is separate from a second sub-band, or a second subset of the channels, to be allocated to non-802.11ax access point radios. Each client device should then be mapped to, or assigned to transmit communications using, either an 802.11ax assigned access point radio or a non-802.11ax access point radio depending on the 802.11ax capabilities of that client device. For example, an 802.11ax supported client device should be mapped to an 802.11ax assigned or preferred access point radio, while a legacy client device should be mapped to a non-802.11ax assigned, a non-802.11ax preferred access point radio, or to an access point radio assigned to any (both 802.11ax and non-802.11ax) client devices. In such a manner, the legacy client device may not consume airtime and/or otherwise interfere with functions of the 802.11ax supported client devices. The mapping or assignment of each client device may indicate a preference to which that client device is encouraged to follow, but may not be a rigid guideline. For example, if a 802.11ax client device attempts to associate to a non-802.11ax radio, then that 802.11ax client device may be discouraged from doing so. Each client device should then be steered, or directed to connect to, the corresponding mapped access point radio. In such a manner, a sub-band, or group of channels, may be dedicated specifically to support or provide preference to 802.11ax capabilities of 802.11ax supported client devices, separate from legacy client devices.

FIG. 1A is an exemplary illustration of an environment 100 representing a network. The environment 100 includes a computing system 110 that reroutes or steers client devices to appropriate access point radios to enhance or optimize a data exchange efficiency, in particular, an efficiency of 802.11ax capabilities, on a network. The computing system 110 may include a remote server so that the routing or steering may be offloaded from the access points or controllers of the access points, thus reducing the respective loads of the access points and the controllers. Additionally, components of the computing system 110, unlike an operating system of the access points, may be easily updated or modified at any time, thus improving an efficiency and efficacy of the deployment. The environment 100 includes access points 121 and 122. Two access points are shown merely for illustrative purposes; any number of access points may be included in a network. In general, the network may include n access points and m client devices, wherein n and m are positive integers. The access point 121 may include radios 131 and 141; the access point 122 may include radios 132 and 142. Any number of radios may be present on each of the access points 121 and 122. In a particular implementation, the access point 121 or 122 may include a 2.4 GHz radio that communicates on a 2.4 GHz band and a 5 GHz radio that communicates on a 5 GHz band. In another particular implementation, an access point, such as the access point 121 or 122, may include a 2.4 GHz radio and two separate 5 GHz radios. In such an implementation, one of the 5 GHz radios may be dedicated to 802.11ax supported client devices while the other of the 5 GHz radios may be dedicated to legacy client devices. In another particular implementation, an access point, such as the access point 121 or 122, may include a 2.4 GHz radio and either one or two 6 GHz radios.

Each of client devices 150, 151, 152, and 153 may connect to one of the access points 121 and 122 in order to transmit data through the network. Although four client devices are shown, any suitable number of client devices is contemplated. The client devices 150, 151, 152, and 153 may connect to a particular radio, such as the radios 131, 141, 132, or 142. A computing component 111 of the computing system 110 may control a connection or mapping between the client devices 150, 151, 152, and 153, and the radios 131, 141, 132, or 142 based on 802.11ax capabilities of the client devices 150, 151, 152, and 153. Other considerations may include, an overall spatial distribution or density of the client devices 150, 151, 152, and 153, and/or of the radios 131, 141, 132, and 142. For example, the computing component 111 may map the client devices to the radios such that all of, or a maximum possible number of, 802.11ax supported client devices are mapped to 802.11ax assigned access point radios while preventing legacy client devices from being mapped to 802.11ax assigned access point radios. If the client devices 150, 151, 152, and 153 have been initially mapped or assigned to the one of the radios 131, 141, 132, and 142, the computing component 111 may remap the client devices 150, 151, 152, and 153 based on the aforementioned considerations. The computing component 111 may steer any of the client devices 150-153 to their respective mapped access point radios. The mechanisms by which the computing component 111 operates to enhance 802.11ax efficiency of a network will be describe further below.

Figure 1B:
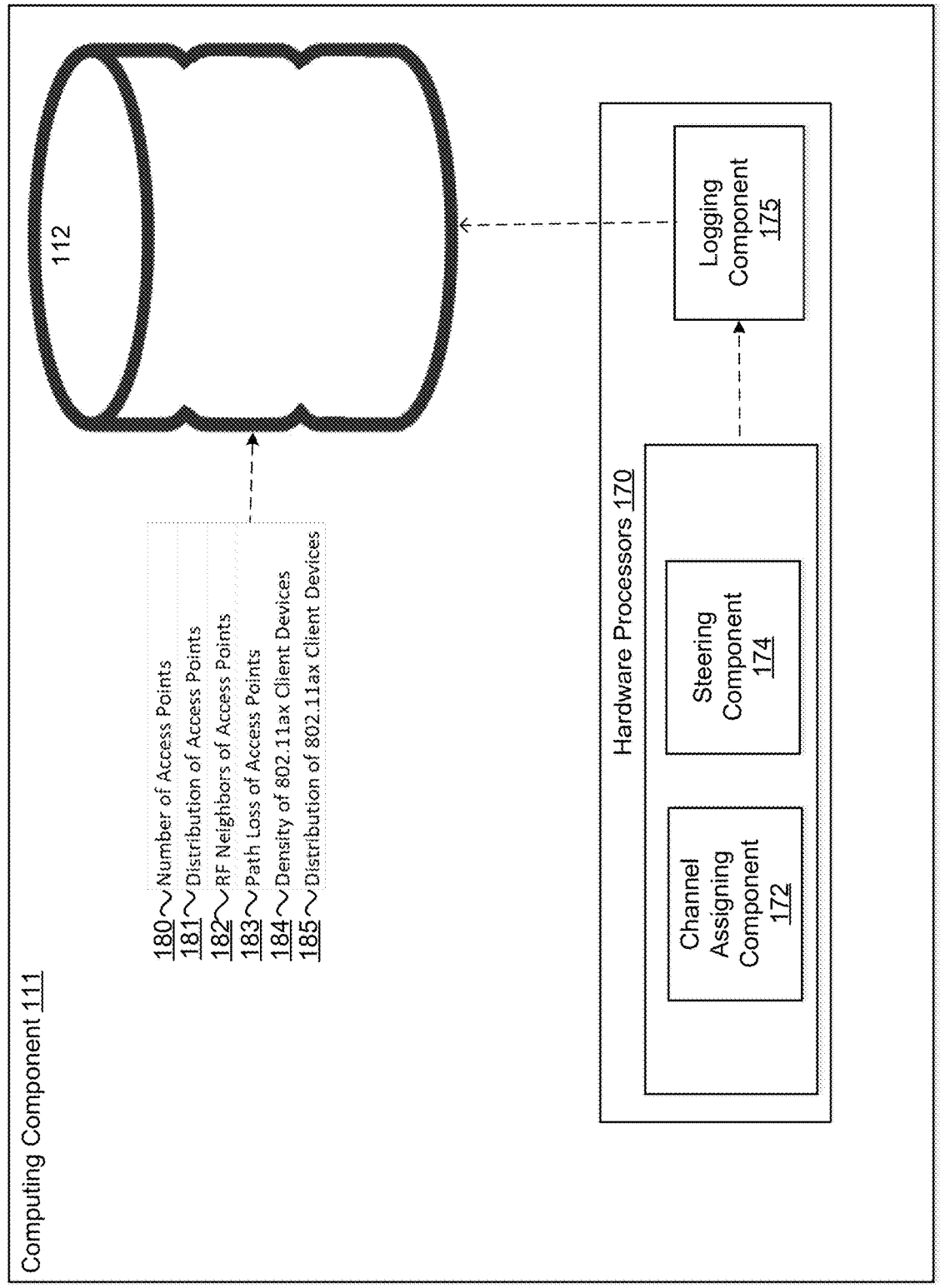
FIG. 1B is an exemplary illustration of a computing component within the computing system of FIG. 1A that reroutes or steers client devices, according to embodiments described in the present disclosure.

FIG. 1B illustrates an overview of the computing system 110, which may include a computing component 111, a database 112, and machine-readable storage media that may store instructions that, when processed, cause the computing component 111, specifically, hardware processors 170, to carry out the rerouting and/or steering of client devices to access point radios. In some embodiments, as shown in FIG. 1B, the database 112 may be integrated internally into the computing component 111, while, in other embodiments, the database 112 may be external to the computing component 111. The computing component 111 may include the hardware processors 170, which may include a channel assigning component 172, a steering component 174, and a logging component 175.

The logging component 175 may collect or obtain data from each of the access points, such as the access points 121 and 122, regarding a number 180 of the access points in a network, their respective spatial locations or distributions 181, RF neighbors such as nearest neighbors 182, and a path loss 183 between nearest neighboring access points. The logging component 175 may obtain or generate a RF neighborhood graph from the data. The access points 121 and 122 may further broadcast their radio capabilities, such as whether or not they have 802.11ax capabilities, and data regarding connected client devices, such as any of the client devices 150-153. The data regarding connected client devices may include a spatial distribution of the client devices 150-153 and/or whether the client devices 150-153 have 802.11ax capabilities, so that the logging component 175 may obtain a density 184 of 802.11ax supported client devices relative to all client devices, and a spatial distribution 185 of 802.11ax supported client devices within a network. The logging component 175 may record the data collected into the database 112. The logging component 175 may periodically collect the data, for example, once every 24 hours, and/or obtain an average, such as a moving average, of the data over every period, such as every 24 hours.

The channel assigning component 172 may access the data obtained by the logging component 175, which may include, for example, the RF neighborhood graph, to periodically determine a number of access points and/or access point radios, such as a subset of the radios 131, 141, 132, and 142, that should be assigned to 802.11ax supported client devices. The channel assigning component 172 may also determine a number of access points and/or access point radios that should be assigned to legacy client devices or ("allow-all") client devices (meaning that the access point radio is assigned to both legacy and 802.11ax supported client devices, without preference towards either). Further details of this mechanism will be described with reference to FIGS. 2B-2C.

Figure 2A:
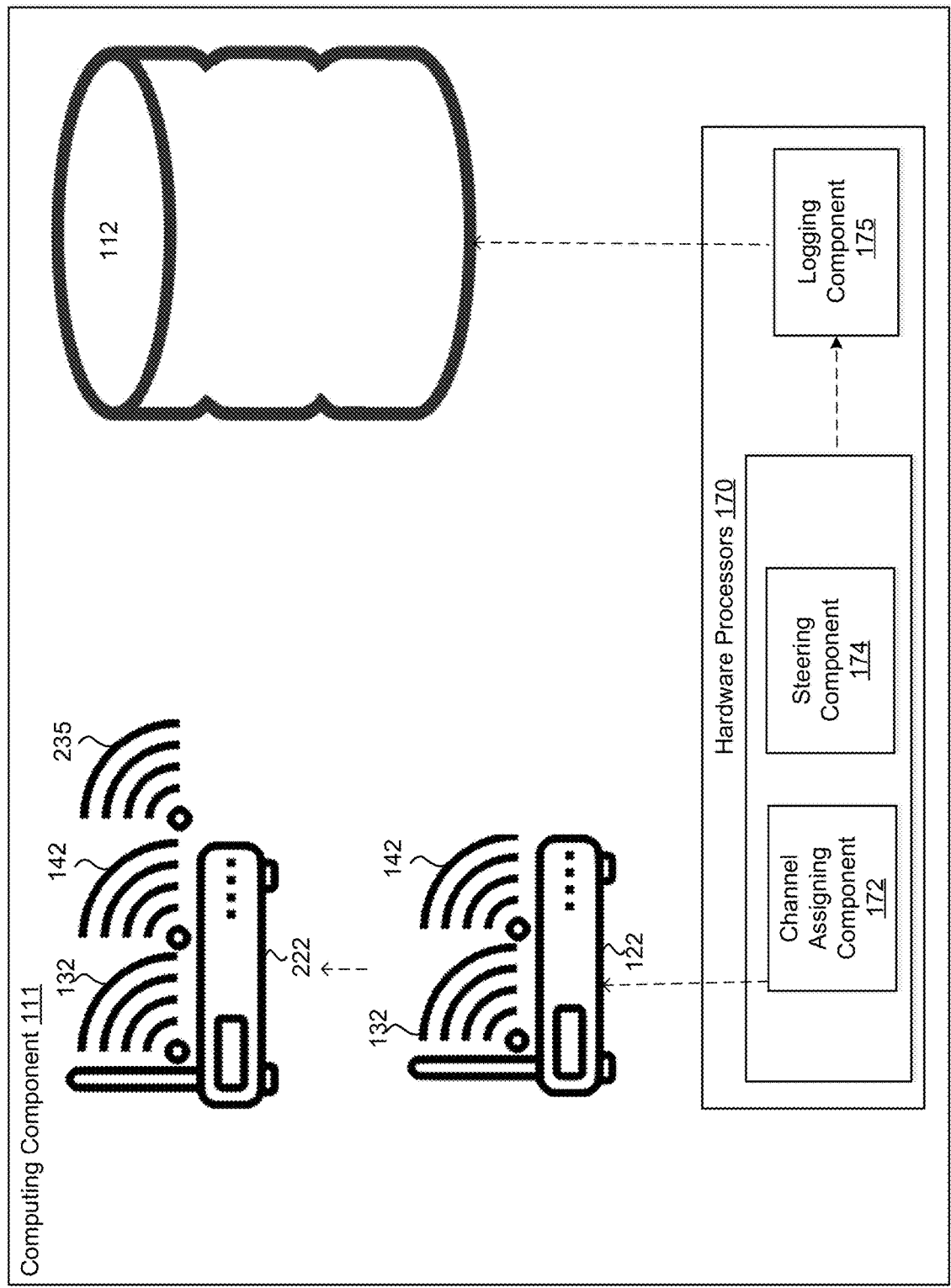
FIG. 2A is an exemplary implementation of a computing component that determines whether any access points are to be switched between radio modes, such as a dual-radio mode and a tri-radio mode, consistent with FIGS. 1A-1B, according to embodiments described in the present disclosure. a number of channels, and which channels, are to be assigned to 802.11ax client devices, legacy client devices, and/or access point radios, consistent with FIGS. 1A-1B, according to embodiments described in the present disclosure.

In some embodiments, as illustrated in FIG. 2A, the channel assigning component 172 may determine whether any of the access points 121, 122, 123, and 124 are to switch between dual-radio and tri-radio mode. In such a scenario, some or all of the access points 121, 122, 123, and 124 may have two operational radios in the dual-radio mode. If the channel assigning component 172 determines that additional channels should be used to transmit data, and/or that additional 802.11ax radios should be included, the channel assigning component 172 may convert one of the radios to the tri-radio mode. For example, such a situation may arise if a number of client devices increases or one of the access points 121, 122, 123, and 124 becomes inoperative. The channel assigning component 172 may likewise determine when one or more channels is/are superfluous, and convert one of the tri-radio access points to a dual-radio access point. The process of converting one of the radios to the tri-radio mode is shown in FIG. 2A. The channel assigning component 172 may determine that additional channels and/or 802.11ax radios should be included in a network, and convert the access point 122 which originally has two operational radios 132 and 142 into an access point having three operational radios, shown as an access point 222 having an additional radio 235. The additional radio 235 may be allocated to an additional channel used to transmit data for client devices. Two of the radios out of the radios 132, 142, and 235 may be 5 GHz radios. Following the conversion by the channel assigning component 172, the logging component 175 may record the conversion and obtain updated data regarding RF neighbors. The updated data may include, data of the nearest neighbors 182 to each of the radios and/or access points, and the path loss 183 between nearest neighboring access points. The logging component 175 may generate an updated RF neighborhood graph from the data.

Figure 2B:
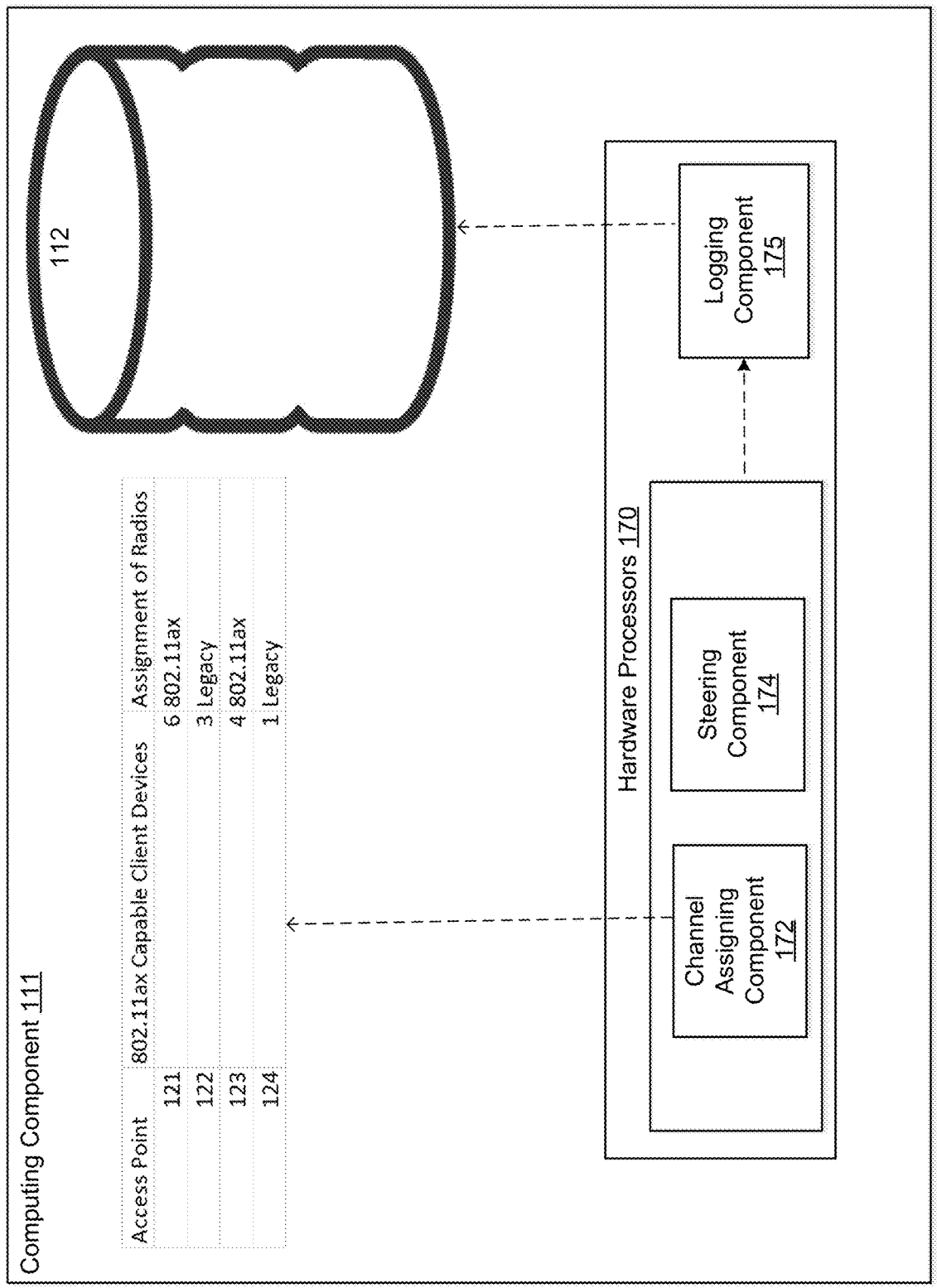
FIG. 2B is an exemplary implementation of a computing component that determines an assignment of radios at the access points, according to a weighted sum algorithm, consistent with FIGS. 1A-1B and 2A, according to embodiments described in the present disclosure.

An exemplary implementation of the channel assigning component 172 is illustrated in FIG. 2B, in which a weighted sum algorithm may be used to determine an assignment of radios at the access points 121 and 122, and access points 123 and 124. For example, the channel assigning component 172 may determine an assignment of radios based at least in part on a number of 802.11ax capable client devices currently connected to each of the access points 121 and 122. The determination may further be based on a maximum number of 802.11ax capable client devices connected to any single access point, which, in FIG. 2B, is 6. The determination may further be based on a minimum number of 802.11ax capable client devices connected to any single access point, which, in FIG. 2B, is 1. The channel assigning component 172 may assign an access point having the maximum number of 802.11ax capable client devices to have all radios, a majority of radios, or some of its radios as 802.11ax radios. The access point having the minimum number of 802.11ax capable client devices may have all radios, a majority of radios, or some of its radios, assigned as legacy radios. The channel assigning component 172 may determine an assignment of radios at the access points 122 and 123 based on a threshold number of 802.11ax capable client devices needed in order for the access point to have 802.11ax assigned radios. Here, in FIG. 2B, the threshold number may be four 802.11ax capable client devices. Thus, any access point that has four or more connected 802.11ax capable client devices may have all, a majority of, or some of its radios assigned as 802.11ax radios. In some embodiments, the channel assigning component 172 may assign the radios of the access points 122 and 123 as allow-all radios, which support both legacy and 802.11ax supported client devices. In some embodiments, the channel assigning component 172 may determine the assignment of radios based on a rate of change of 802.11ax capable client devices connected to each of the access points 121, 122, 123, and 124. For example, if the rate of change of 802.11ax capable client devices connected to a particular access point is above a threshold, a number of 802.11ax capable client devices connected to a particular access point may be increasing rapidly. Therefore, the channel assigning component 172 may assign all of, a majority of, or some of the radios in that particular access point as 802.11ax radios.

Figure 2C:
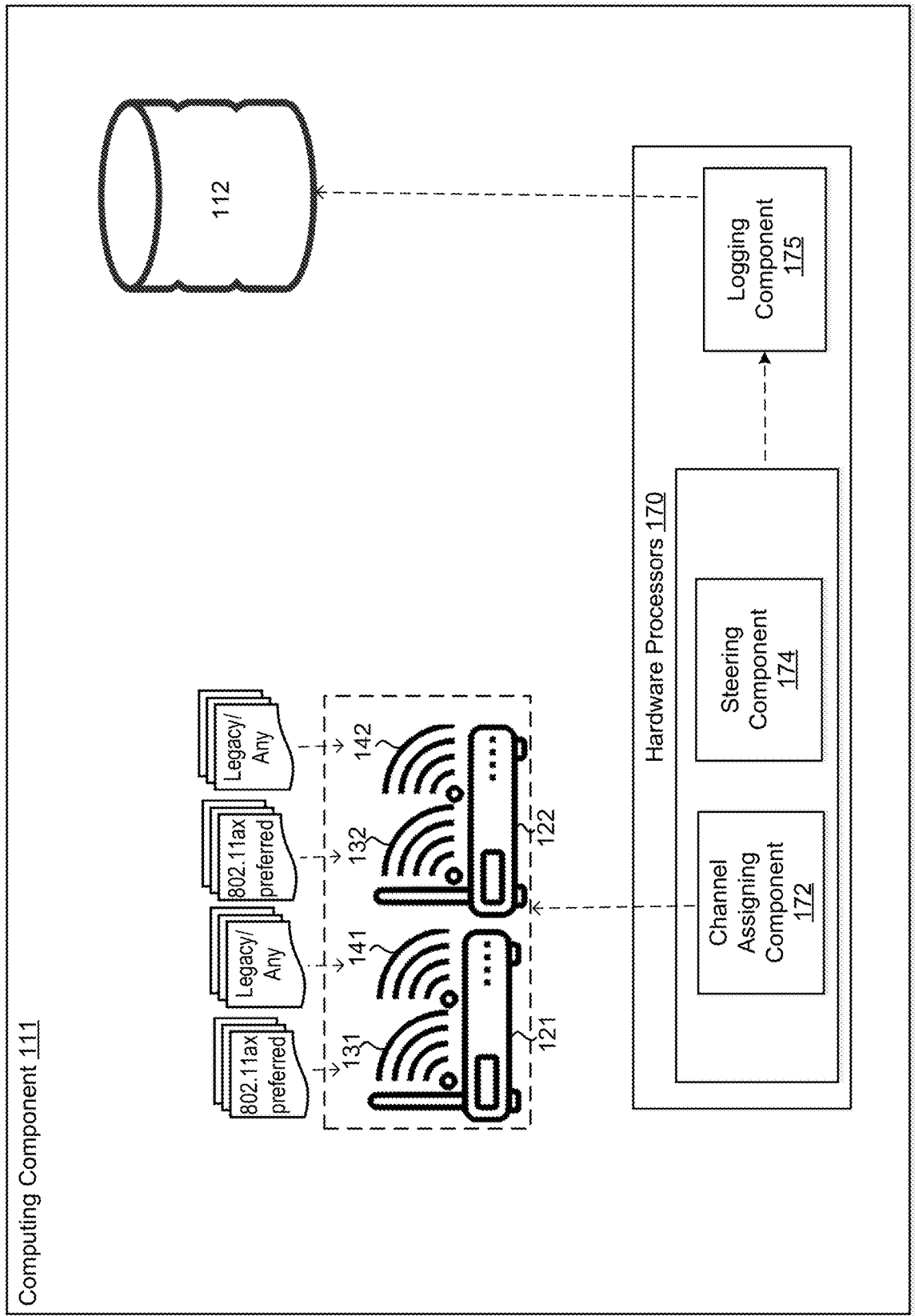
FIG. 2C is an exemplary implementation of a computing component that transmits, to each of the access points, their preferred client device types, consistent with FIGS. 1A-1B and 2A-2B, according to embodiments described in the present disclosure.

The channel assigning component 172 may map or assign preferences of particular types of client devices to each of the access point radios 131, 132, 141, and 142. The mapping or assignment may indicate whether an access point radio has a preference for 802.11ax supported client devices, non-802.11ax supported client devices, or allow-all devices, so that a client device may be encouraged to connect to a particular channel and/or a radio. As shown in FIG. 2C, the channel assigning component 172 may transmit, to each of the access points 121 and 122, preferred client device types of the respective access points 121 and 122. For example, the preferred client device types may include one of non-11ax client devices, 11ax client devices, or both non-11ax and 11ax client devices. Once each of the access points 121 and 122 receives their respective preferred client device types, the access points 121 and 122 may react accordingly to probe requests from client devices seeking to connect. In some examples, after a non-11ax preferred radio receives a probe request from an 802.11ax device, that non-11ax preferred radio may transmit, to the 802.11ax device, a probe response including a frame indicating that association on such a non-11ax preferred radio is discouraged.

The term "assigned to" may refer to a preference being given to a particular type of client device, such as an 802.11ax supported client device, over another type of client device in connecting to a particular radio. In some embodiments, one of the radios 131, 141, 132, and 142 previously assigned to 802.11ax supported client devices (e.g., first access point radios) may be reassigned to allow-all client devices or to legacy client devices (e.g., second access point radios), and vice versa, due in part to a change in a distribution of 802.11ax supported client devices in a network.

In some embodiments, if an access point has two radios, one of which is 2.4 GHz and the other of which is 5 GHz, one of the radios, such as the 5 GHz radio, may be assigned to 802.11ax supported client devices. The other radio may be assigned as allow-all, to allow client devices to connect, whether or not they are 802.11ax supported. In such a manner, the other radio may adaptively accommodate additional or fewer client devices. For example, such a situation may arise if 802.11ax supported client devices enter or leave a network without interruption in data transmission.

Additionally, If an access point has three radios, in which one of the radios is 2.4 GHz and the other two are 5 GHz, one of the 5 GHz radios may be assigned to 802.11ax supported client devices and the other 5 GHz radio may be assigned to legacy client devices. If an access point has two radios, one of which is 2.4 GHz and the other of which is 6 GHz, the 6 GHz radio may be assigned to 802.11ax supported client devices.

Figure 2D:
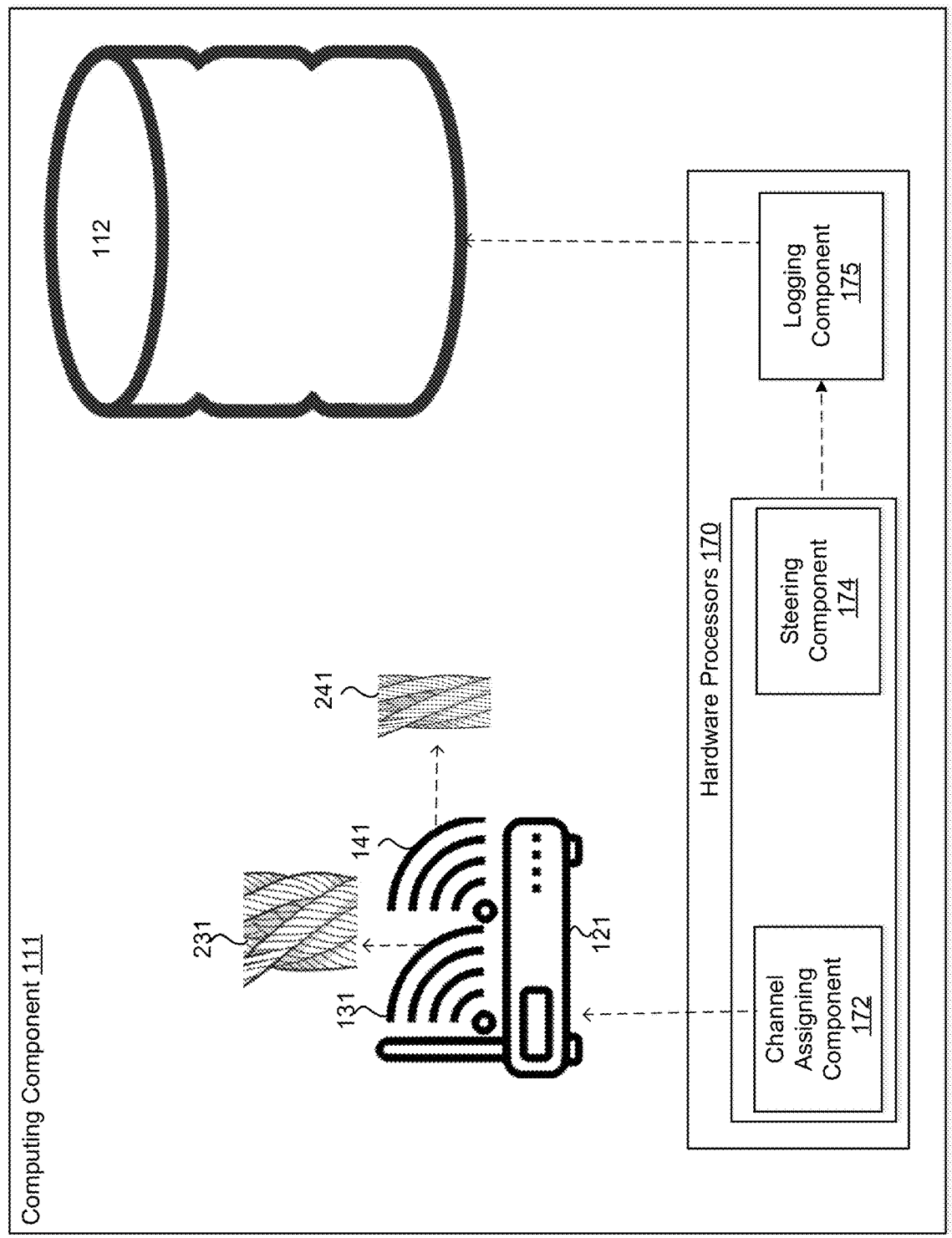
FIG. 2D is an exemplary implementation of a computing component that allocates channels to the radios, consistent with FIGS. 1A-1B and 2A-2C, according to embodiments described in the present disclosure.

The channel assigning component 172 may further allocate a channel or sub-band to each of the radios 131, 141, 132, and 142. Each of the radios 131, 141, 132, and 142 may transmit data on the allocated channel or sub-band, as shown in FIG. 2D. In some embodiments, the channel assigning component 172 may initially determine that a number of the 802.11ax assigned access point radios is above a first threshold and a number of the client devices, or a number of the 802.11ax supported client devices, is above a second threshold. Thus, if a number of 802.11ax assigned access point radios, client devices, and/or 802.11ax supported client devices is too few, the channel assigning component 172 may refrain from a process of allocating a channel or sub-band to each of the radios, but rather, wait until a number of 802.11ax assigned access point radios, client devices, and/or 802.11ax supported client devices increases so that the increase in efficiency would be greater.

As merely an exemplary illustration, the channel assigning component 172 may allocate a channel or sub-band (hereinafter "channel") 231 to the radio 131 and a channel 241 to the radio 141. In some embodiments, the channel assigning component 172 may determine channels to allocate based on an amount of occupancy, traffic and/or interference in each of existing channels, and select channels having among lowest amounts of occupancy, traffic and/or interference. In some embodiments, the channel assigning component 172 may allocate channels having lowest or lower amounts of occupancy, traffic and/or interference to radios assigned to 802.11ax supported client devices in an effort to increase data transmission speed and efficiency of the 802.11ax supported client devices. For example, in FIG. 2D, the channel 231 may have a lower amount of occupancy and more available bandwidth compared to the channel 241, and thus, may be allocated to the radio 131, which was assigned as an 802.11ax radio. In some embodiments, the channels allocated to the radios assigned to 802.11ax supported client devices may belong to a same band of a spectrum. For example, the channels allocated to all the radios assigned to 802.11ax supported client devices may all be from an upper band, or all be from a lower band, of a 5 GHz spectrum, depending on whichever of the upper band or the lower band has a lower amount of occupancy, traffic and/or interference, and/or a density, proportion, or number of the 802.11ax supported client devices. Likewise, the channels allocated to the radios assigned to legacy client devices, or allow-all radios, may belong to a same band of a spectrum, for example, whichever sub-band is unoccupied by the radios assigned to 802.11ax supported client devices. Another consideration in determining which channels are to be allocated to the radios assigned to the legacy client devices includes selecting channels that would reduce or minimize interference with the channels allocated to the radios assigned to the 802.11ax supported client devices. In such a manner, 802.11ax supported client devices may operate on a different channel from legacy devices, thus improving a spectral efficiency, latency, and WLAN throughput of the 802.11ax supported client devices. The channel assigning component 172 may allocate a channel or sub-band to each of the remaining radios in a same or similar manner. The channel assigning component 172 may further assign channels to the radios such that radios in a neighborhood within threshold distances of one another do not operate in a same frequency. The channel assigning component 172 may further adjust an amount of power transmitted by each of the radios based on an amount of coverage in a network and/or a number of access points in the network. For example, if the number of access points is lower, the amount of power transmitted may be adjusted to be higher, and vice versa.

Figure 2E:
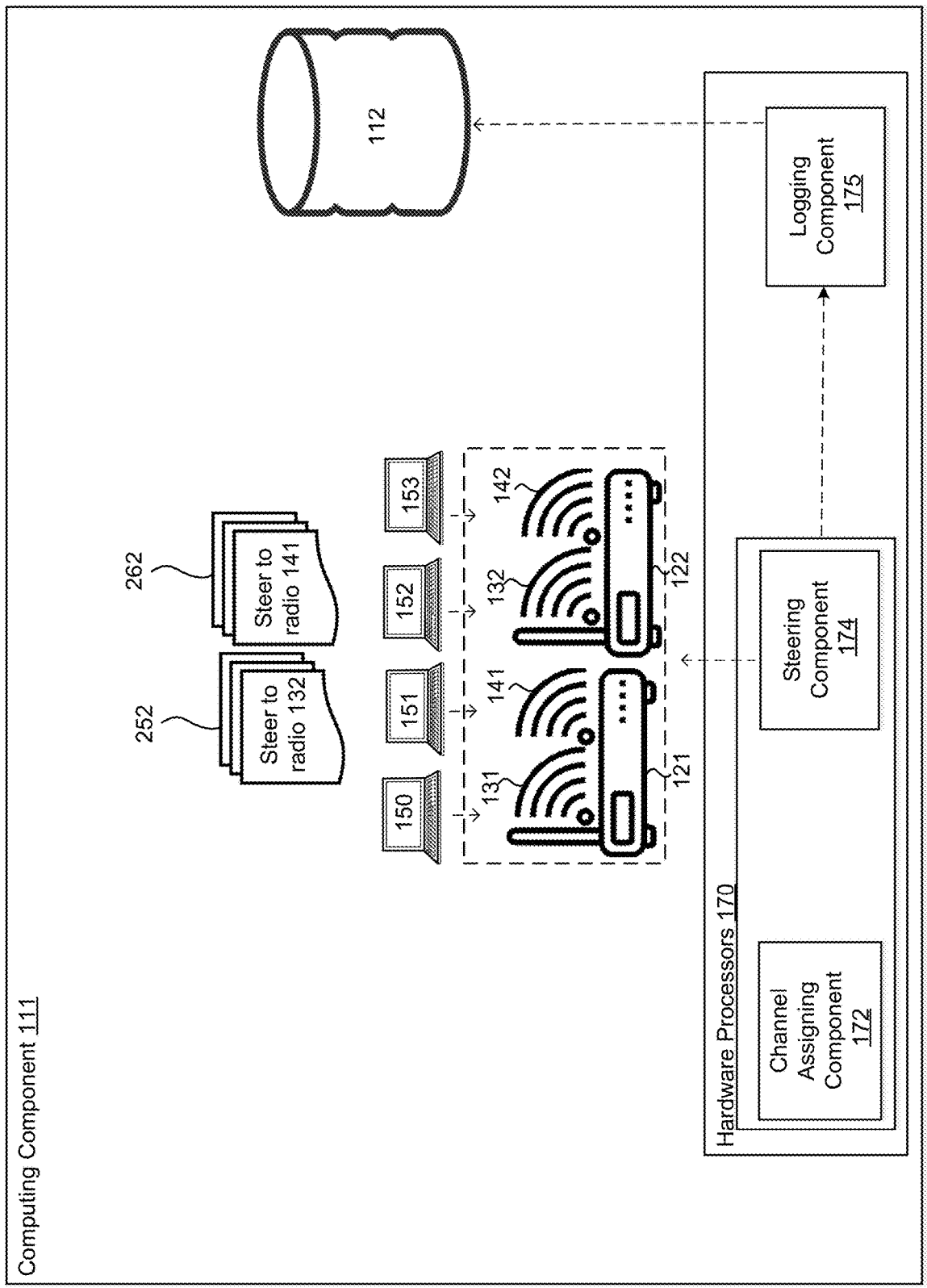
FIG. 2E is an exemplary implementation of a computing component that steers the client devices to a particular radio, consistent with FIGS. 1A-1B and 2A-2D, according to embodiments described in the present disclosure.

The steering component 174 may steer any of the client devices 150-153 to a particular radio based at least in part on the 802.11ax capabilities of the client devices 150-153 and the radios 131, 132, 141, and 142. The steering component 174 may send transition requests 252 and 262, respectively, to the client devices 151 and 152. These transition requests 252 and 262 may instruct the client devices 151 and 152 to move to a specific destination in order to connect to a mapped access point radio, as shown in FIG. 2E. If a client device fails to recognize and/or honor the transition request, for example, when that client device lacks 802.11v capabilities, the steering component 174 may implement a denial of service and/or deauthentication protocol such that only a radio mapped to that client would accept a connection request. For example, if the client device 153 were mapped to the radio 142, then only the radio 142 would accept a connection request from the client device 153. If the client device 153 tried to connect to any other radio such as 131 or 141, those other radios would not accept the connection request. In another scenario, if a client device does recognize the transition request but fails to honor the transition request, the steering component 174 may repeat the request, and/or provide further incentive to honor the request by including, in a frame associated with the 802.11v request, an indication that disassociation from a current access point is imminent.

Figure 2F:
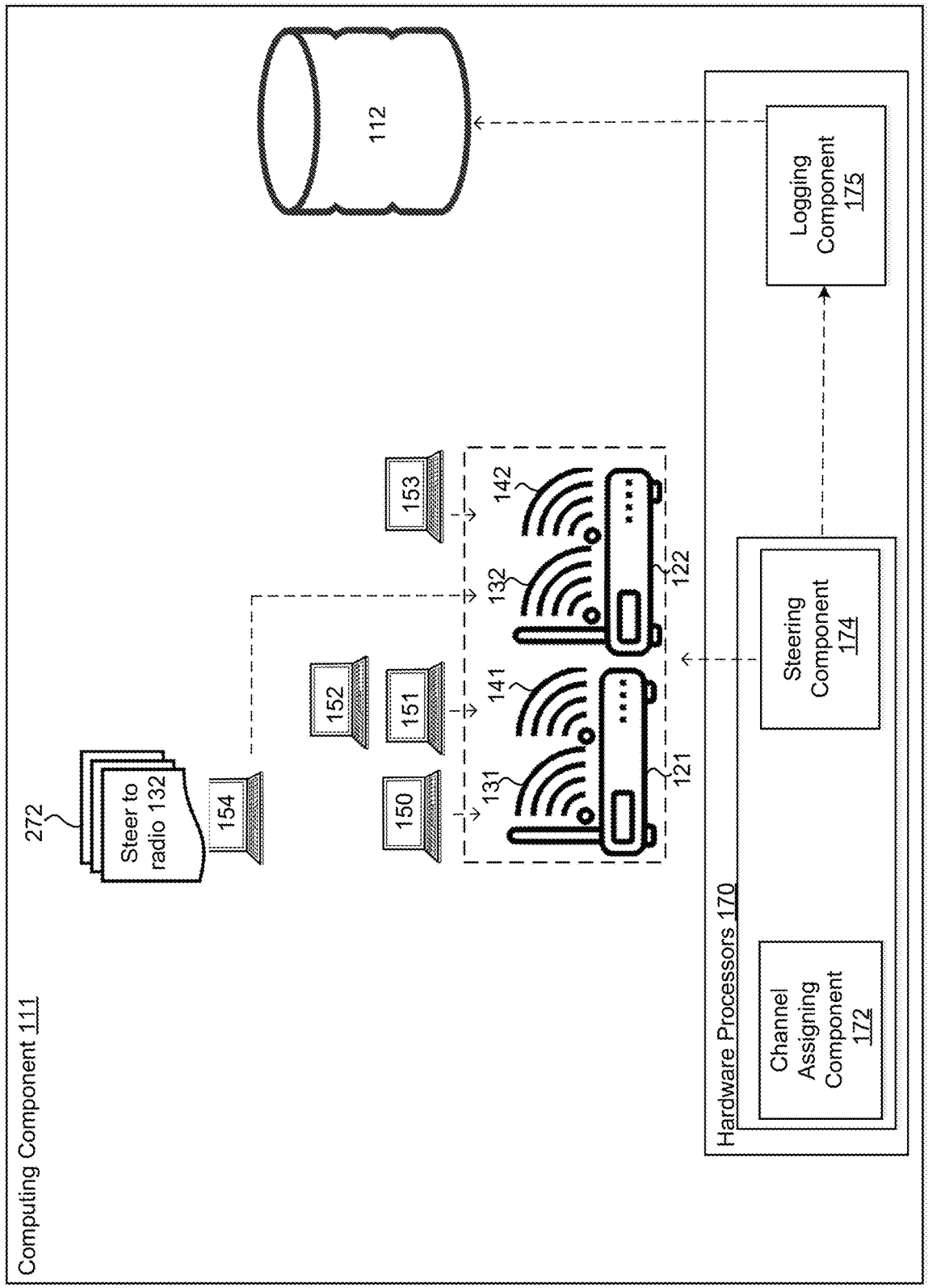
FIG. 2F is an exemplary implementation of a computing component that steers the client devices to a particular radio, and attempts to redistribute other client devices if any of the client devices fail to honor a transition request, consistent with FIGS. 1A-1B and 2A-2E, according to embodiments described in the present disclosure.

After a threshold amount of time, if the client device still fails to honor the transition request, the steering component 174 may disassociate the client device from the current access point to prohibit transmission and reception of data from the current access point. Alternatively, if the client device still fails to honor the transition request after a threshold amount of time, the steering component 174 may still permit the client device to be associated with the current access point. The steering component 174 may then attempt to transmit a transition request to a different client device to redistribute the client devices among the access points. For example, as shown in FIG. 2F, if the client device 152 honors the transition request 262 but the client device 151 fails to honor the transition request 252, the steering component 174 may still permit the client device 151 to be associated with the radio 141. However, relatively fewer client devices may be currently assigned to or communicating using the radio 132, as a result of the client device 151 failing to honor the transition request 252. Therefore, the steering component 174 may redistribute other client devices to rebalance client devices among radios. For example, the steering component 174 may attempt to transmit a transition request to a client device 154 which may currently be connected to the radio 131. The steering component 174 may attempt to steer the client device 154 to the radio 132, so that a load of the radio 132 is comparable with loads of other radios in the network. This redistribution may further take into account matching capabilities of 802.11ax among client devices and radios.

In some embodiments, if the client device attempts to associate to a different access point radio from the mapped radio, the steering component 174 may transmit, in a frame associated with the 802.11v request, an indication that the client device is restricted from associating with that different access point radio. Alternatively or additionally, the steering component 174 may transmit, in a frame associated with the 802.11v request, that a basic service set identification (BSSID) of that access point radio is excluded.

Figure 2G:
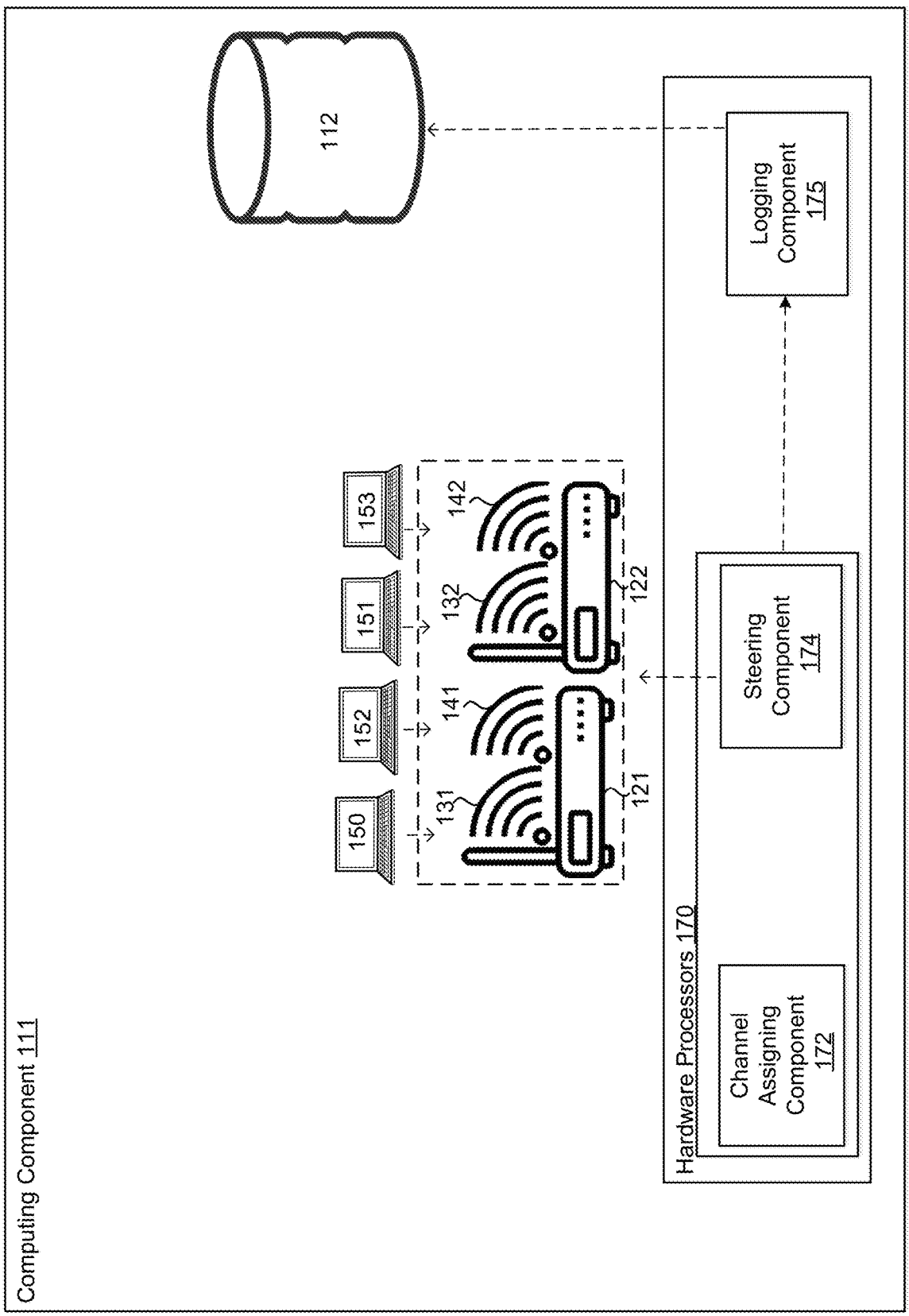
FIG. 2G is an exemplary implementation of a computing component that completes steering of the client devices to a particular radio, consistent with FIGS. 1A-1B and 2A-2F, according to embodiments described in the present disclosure.

An example of a successful steering procedure is shown in FIG. 2G. The steering component 174 may perform an additional verification that 802.11ax efficiency is accounted for during a steering procedure, and ensure effectiveness of the steering procedure so that previous steers need not be undone. In some embodiments, the steering component 174 may confirm that an 802.11ax supported client device is not steered towards a non-802.11ax access point radio, and that a legacy client device is not steered towards an 802.11ax assigned access point radio. The steering component 174 may further periodically steer legacy client devices away from 802.11ax assigned access point radios and 802.11ax supported client devices away from non-802.11ax access point radios. In addition, the steering component 174 may steer client devices that support 6 GHz communications towards radios communicating on 6 GHz channels. In some embodiments, the steering component 174 may perform steering of client devices to particular radios depending on which of the channels assigned to the radios has a lowest current amount of occupancy, traffic or interference, and/or which of the radios 131, 132, 141, and 142 has a highest available or remaining load.

Figure 3A:
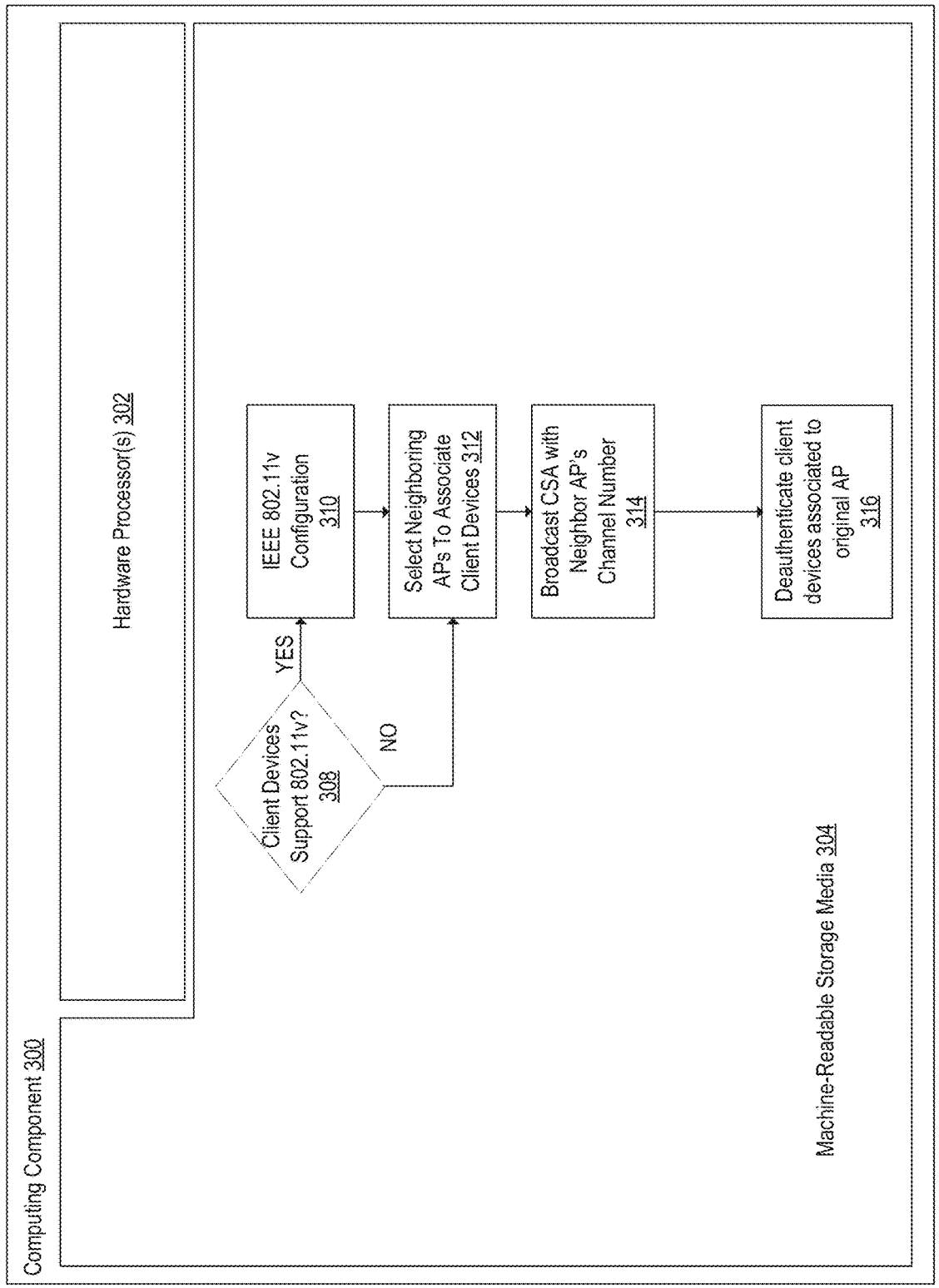
FIG. 3A is an exemplary flowchart, illustrating a method of steering client devices to appropriate access point radios in improving 802.11ax capabilities, consistent with FIGS. 1A-1B and 2A-2G, according to embodiments described in the present disclosure.

FIG. 3A illustrates a computing component 300 that performs an illustrative method of steering client devices to appropriate access point radios in improving 802.11ax capabilities. In particular, FIG. 3A recaps an exemplary implementation of the steering component 174. In some embodiments, the computing component 300 may comprise one or more hardware processors 302 and machine-readable storage media 304 storing a set of machine-readable/machine-executable instructions that, when executed, cause the hardware processor(s) 302 to steer client devices to mapped access point radios. It should be appreciated that there can be additional, fewer, or alternative steps performed in similar or alternative orders, or in parallel, within the scope of the various embodiments discussed herein unless otherwise stated. The computing component 300 may be implemented as the steering component 174, consistent with FIGS. 1A and 1B. The machine-readable storage media 304 may include suitable machine-readable storage media described in FIG. 6.

Each of the access points, such as, the access points 121 and 122 in FIGS. 1A and 2E, have already received respective preferred client device types, for example, 802.11ax, legacy, or allow-all, from the channel assigning component 172, as described with reference to FIG. 2C. In decision 308, the steering component 174 may determine whether client devices that need to be steered support an 802.11v protocol. In particular, the client devices that need to be steered may include the client devices 151 and 152, as described with reference to FIG. 2E. In step 310, the steering component 174 may steer the client devices according to an 802.11v protocol, as will be described in FIG. 3B. In step 312, the steering component 174 may steer client devices that fail to support the 802.11v protocol. The steering component 174 may determine one or more neighboring access points relative to the current access points to which the client devices are connected. The determination may be based on the data stored in the database 112. In particular, the steering component 174 may select the access point 121 to associate to the client device 152, and the access point 122 to associate to the client device 151, as described with reference to FIG. 2E. In step 314, the steering component 174 may instruct the access points 121 and 122 to broadcast a channel switch announcement (CSA) to the client devices. Data relating to the one or more neighboring access points can be included in the CSA in management frames or beacon frames. The CSA may also include a new channel number field broadcast that is populated with operating channel numbers of one or more neighboring access points to which the client devices can connect. The CSA may also include an allotted time period by which the client devices are to transition to the one or more neighboring access points. After the given time period, the steering component 174 may determine whether the client devices connected to the access point have associated with the one or more neighboring access points specified in the CSA within the allotted time period. Upon expiration of the allotted time period, the steering component 174 determines whether the client devices are still connected to the access point. If any client devices remain connected to or associated with the original access point, the steering component 174 can deauthenticate these client devices and prevent these client devices from accessing the network through the access point, at step 316. For example, if the steering component 174 determines that the client device 152 remains associated with the access point 122, rather than moving to the access point 121, the steering component 174 may deauthenticate the client device 152 from the access point 122. As described with reference to FIG. 2F, alternatively, the steering component 174 may still permit the client device 152 to transmit and receive data from the access point 122, and attempt to redistribute other client devices.

Figure 3B:
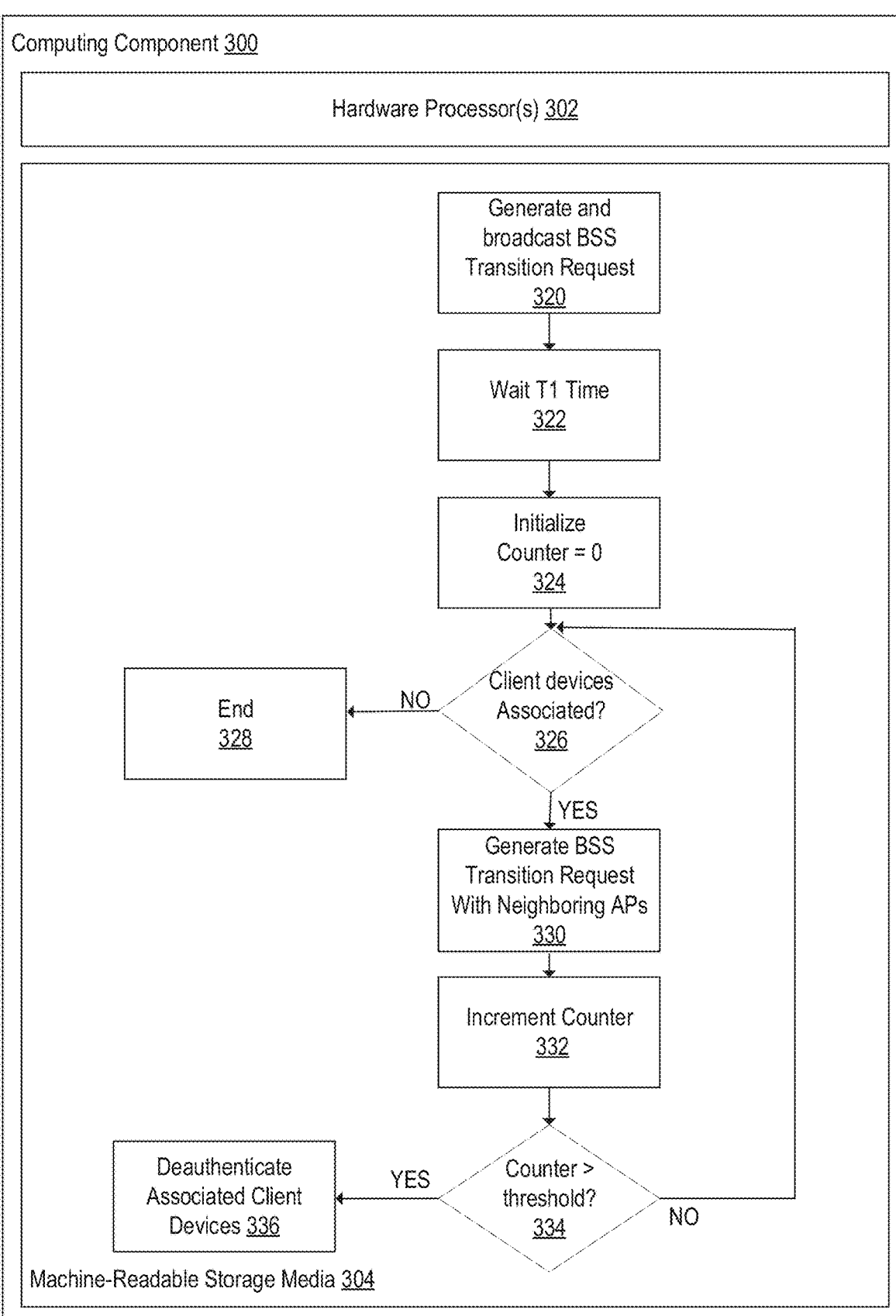
FIG. 3B is an exemplary flowchart, extending upon FIG. 3A and illustrating a method of steering client devices if the client devices support a particular wireless protocol, consistent with FIGS. 1A-1B and 2A-2G and 3A, according to embodiments described in the present disclosure.

FIG. 3B illustrates the example computing component 300 that can be configured to perform an operation to steer client devices to a different access point in accordance with various embodiments of the present disclosure. FIG. 3B is a continuation of FIG. 3A. In particular, FIG. 3B expands step 310 of FIG. 3A. As shown in FIG. 3B, at step 320, after the steering component 174 determines that the client devices which need to be steered (for example, the client devices 151 and 152 in FIG. 2E), support a particular wireless protocol (e.g., IEEE 802.11v or "802.11v"), the steering component 174 may then generate a basic service set (BSS) transition request to be broadcasted by the access point, at step 320. For example, the access points 121 and 122 may send a BSS to the client devices 151 and 152 at step 320. In general, a BSS transition request is a request made by an access point requesting or suggesting client devices connected to the access point to transition to another neighboring access point or a set of preferred access points. This BSS transition request can be utilized to load balance or, in some cases, terminate a virtual network, such as a BSSID, provided by the access point. In this case, the steering component 174 generates and broadcasts an unsolicited BSS transition request to the client devices supporting the particular wireless protocol. Included in the unsolicited BSS transition request is a disassociation flag indicating an intent of the access point to disassociate the client devices after a time period. This time period, in some embodiments, can be measured or indicated by a number of subsequent beacon frames sent by the access point to the client devices. For example, after setting the disassociation flag in the unsolicited BSS transition request, the steering component 174 can actively disassociate the client devices after 10 subsequent beacon frames. In some embodiments, the time period within which the client devices are to disassociate from the access point is user configurable. For example, a network management entity can configure an access point to generate an unsolicited BSS transition request with a disassociation flag set for 20 subsequent beacon frames.

At step 322, after the steering component 174 generates the unsolicited BSS transition request requesting or suggesting the client devices to transition to other access points, the steering component 174 waits for a time period as indicated by the disassociation flag (e.g., after 10 subsequent beacon frames). Upon expiration of this time period, the steering component 174 initializes a counter, at step 324, to execute a loop (e.g., steps 326 to 334) to identify and disassociate each of the client devices that remain connected to the access point. At decision 326, the steering component 174 determines if any of the client devices remain connected to or associated with the access point. If no client devices are associated with the access point, the process ends in step 328. This indicates that the client devices have transitioned to other access points. If the client devices remain associated with the access point, the steering component 174, at step 330, generates another unsolicited BSS transition request requesting or suggesting the client devices to transition. This time, the unsolicited BSS transition request further includes a list of neighboring access points to which the client devices may transition to. The list of neighboring access points, in some embodiments, can be obtained from the database 112. The steering component 174 then, at step 332, increments the counter until all of the client devices that support the particular wireless protocol have transitioned to other neighboring access points. This loop will continue, following determinations of whether the counter exceeds the threshold in decision 334, until the counter is greater than a threshold, at which point the loop stops and the steering component 174 proceeds to step 336. The threshold, in some embodiments, can be a number of original client devices that support the particular wireless protocol. In step 336, the steering component 174 may deauthenticate client devices that remain associated with an original access point, as described with reference to FIG. 2E.

In summary, operations performed by the steering component 174 as discussed with respect to FIGS. 3A and 3B describe an approach of gradually nudging client devices connected to an access point to transition. For example, initially, the steering component 174 broadcasts an unsolicited BSS transition request to the client devices suggesting the client devices to transition to other access points. After the access point waits for some threshold period of time, if the client devices are still connected to the access point, the access point broadcasts another BSS transition request. This time, the BSS transition request includes a list of neighboring access points to which the client devices can transition to. The access point then checks whether or not each client device has transitioned to a neighboring access point. After the access point checks whether or not each client device has transitioned to a neighboring access point, if there are still some client devices connected to the access point, the access point will eventually disassociate and deauthenticate these client devices. Therefore, the operations discussed with respect to FIGS. 3A and 3B provide a systematic approach of gradual escalation in disassociating client devices from an access point by, initially, gently nudging the client devices to disassociate from the access point. If the client devices have failed to disassociate, the steering component 174 may moderately nudge the client devices to disassociate from the access point. If the client devices have still failed to disassociate, finally, the steering component 174 may disassociate the client devices from the access point. In this manner, any network interruptions or disruptions that the client devices may experience during an access point operational change are minimized.

Figure 4:
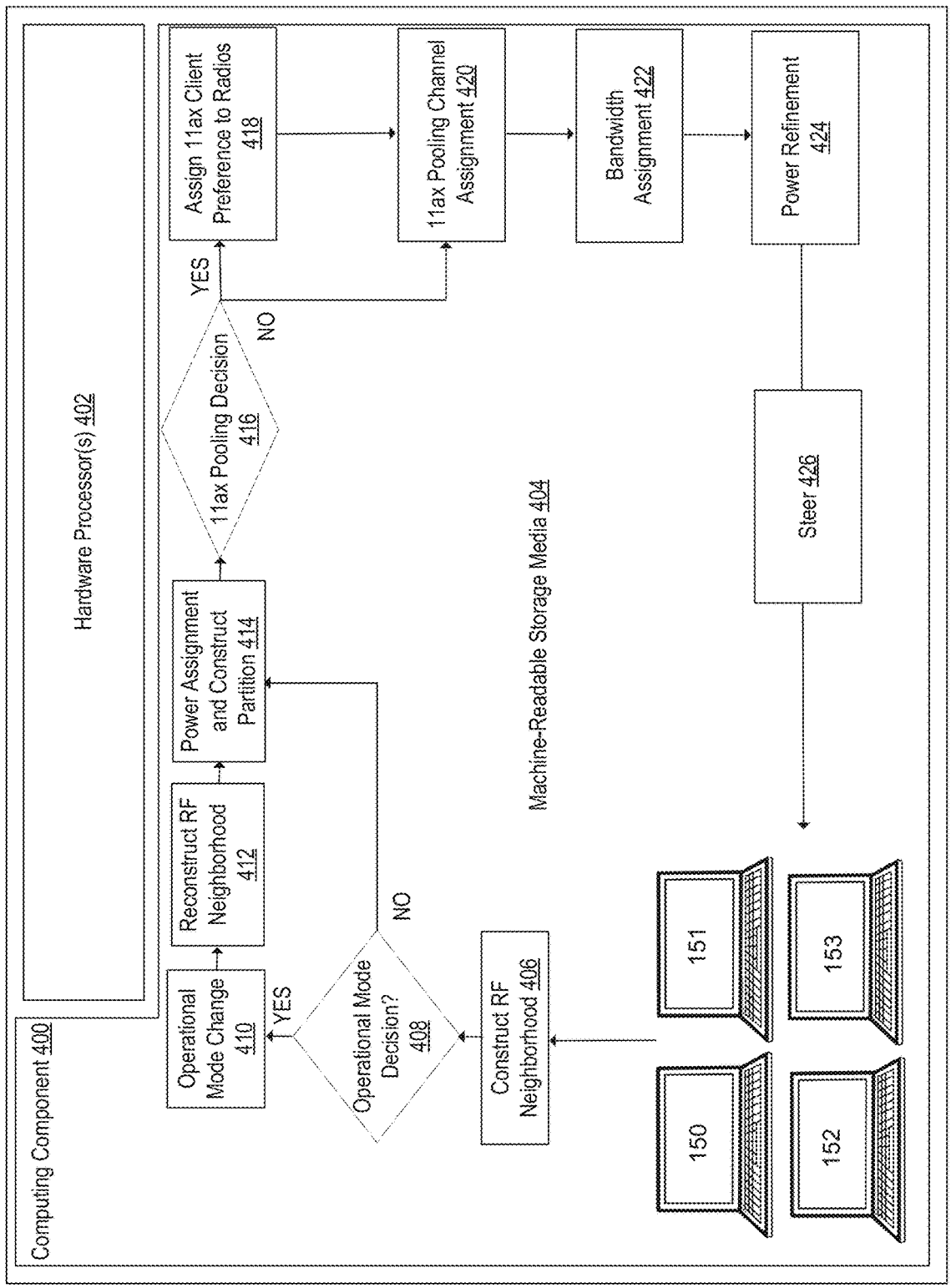
FIG. 4 is an exemplary flowchart that provides an overall perspective of an exemplary implementation of a computing component that performs channel assigning, steering, and logging, consistent with FIGS. 1A-1B, 2A-2G and 3A-3B, according to embodiments described in the present disclosure.

FIG. 4 illustrates a computing component 400 that performs an illustrative method of steering client devices to appropriate access point radios in improving 802.11ax capabilities. The computing component may be implemented as the computing component 111 of FIGS. 1A-1B. In particular, FIG. 4 provides an overall recap of an exemplary implementation of the computing component 111, which includes operations of the channel assigning component 172, the steering component 174, and the logging component 175. In some embodiments, the computing component 400 may comprise one or more hardware processors 402 and machine-readable storage media 404 storing a set of machine-readable/machine-executable instructions that, when executed, cause the hardware processor(s) 402 to steer client devices to mapped access point radios.

At step 406, the logging component 175 constructs a RF neighborhood graph 316 from data regarding distribution of client devices (for example, the client devices 150, 151, 152, and 153) and how many 802.11ax client devices are associated with each access point. The particular functions of step 406 were previously described with respect to FIG. 1B.

At decision 408, the channel assigning component 172 may determine whether any of the access points should change operational modes, for example, from a dual-radio mode to a tri-radio mode, or vice versa. An exemplary criteria involved in decision 408 was described previously with respect to FIG. 2A. At step 410, if the channel assigning component 172 determines that an operational mode of at least one of the access points should be changed, the channel assigning component 172 may proceed to switch an operational mode of any access point determined to require such a switch. If the channel assigning component 172 determines that no operational mode needs to be changed, the channel assigning component 172 may proceed to step 414, which will be described further below. The channel assigning component 172 may determine that no operational mode needs to be switched on the basis that less than a threshold amount of time has elapsed since a previous operational mode change, and/or that a number and/or distribution of client devices and access points in the network has not changed by more than a threshold measure. For example, if some radios support or are associated with a disproportionately lower number of 802.11ax compatible client devices compared to other radios, the channel assigning component 172 may switch an access point from a dual-radio mode to a tri-radio mode in order to add an additional radio that supports 802.11ax. In some embodiments, the channel assigning component 172 may determine whether an operational mode needs to be switched based on load balancing at the access points. For example, the channel assigning component 172 may determine that an operational mode should be switched if such switch results in an increased balance of loads among radios in the network.

At step 412, the channel assigning component 172 may transmit, to the logging component 175, an instruction to reconstruct the RF neighborhood map due to the change in the operational mode of at least one radio, as described with reference to FIG. 2A. For example, if an access point is switched from a dual-radio to a tri-radio mode, the logging component 175 may take into account the additional 802.11ax radio resulting from the switch to the tri-radio mode, which may associate with neighboring 802.11ax client devices. In step 414, the channel assigning component 172 may divide the network into RF partitions and assign an amount of power transmitted by each of the radios in the network. For example, the channel assigning component 172 may assign an amount of power transmitted by each of the radios based on an amount of coverage in a network and/or a number of access points in the network. In particular, if the number of access points is lower, the amount of power transmitted may be adjusted to be higher, and vice versa.

At decision 416, the channel assigning component 172 may determine whether an existing assignment of each of the access points and/or radios is to be changed, as described with reference to FIGS. 2B and 2C. The determination may be based on the 11ax client density in each RF neighborhood or partition. In particular, the 11ax pooling decision may dedicate or assign each of the access points and/or radios, for example, the access points 121 and 122 and the respective associated radios 131/141, and 132/142 of FIGS. 1A-1B, as either 802.11ax preferred, legacy preferred, or allow-all. In step 418, if the channel assigning component 172 determines that an existing assignment of each of the access points and/or radios is to be changed, the channel assigning component 172 may determine a new assignment of each of the access points and/or radios and transmit the newly determined assignments to the access points. If the channel assigning component 172 determines that an existing assignment of each of the access points and/or radios is to be unaltered, the channel assigning component 172 may proceed to step 420.

In step 420, the channel assigning component 172 may assign channels to each of the radios, as described with reference to FIG. 2D. For example, the channel assigning component 172 may assign either an upper sub-band or a lower sub-band of a 5 GHz spectrum based on a channel occupancy and density of 802.11ax client devices. In step 422, the channel assigning component 172 may assign or determine bandwidths of each of the channels that were assigned to each of the radios in step 420. In some embodiments, the channel assigning component 172 may assign a bandwidth of each of the channels depending on how many client devices, and/or a density of 802.11ax client devices, that are associated with or assigned to the corresponding radios. For example, referring to FIG. 2D, a higher a number of client devices assigned to the radio 131, a larger a bandwidth of the channel 231. In step 424, the channel assigning component 172 may further refine a power transmitted by each of the radios, as described with reference to FIG. 2D. In some embodiments, the power transmitted by each of the radios may be determined based on a coverage area of other radios in the network, and/or a number of access points assigned to a particular radio. For example, if the other neighboring radios and/or access points to a particular radio collectively have a higher coverage area, the power transmitted by that particular radio may be relatively lower. Proceeding to step 426, the steering component 174 may perform steering of any of the client devices 150, 151, 152, and 153, as described with reference to FIGS. 2E-2G.

Figure 5:
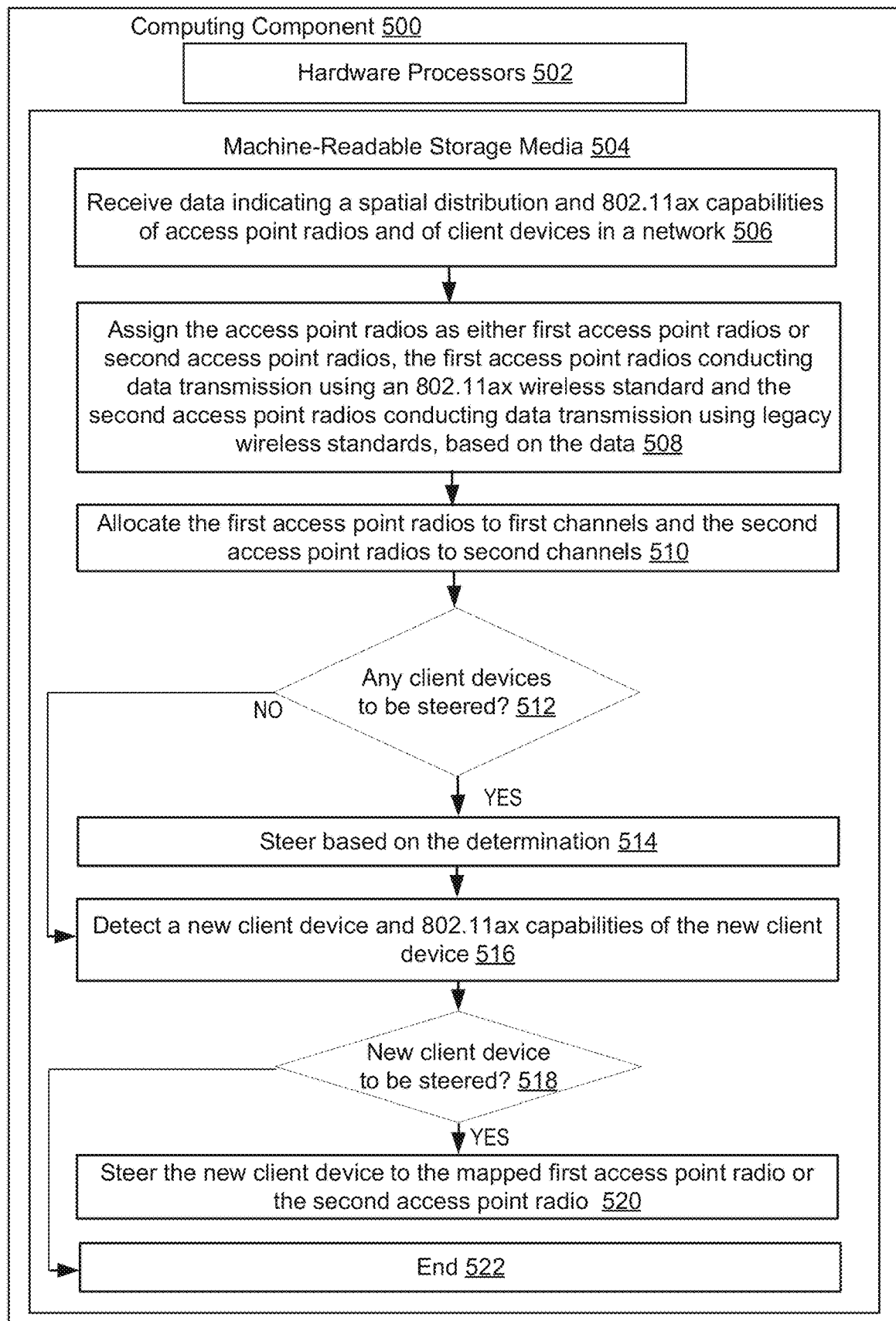
FIG. 5 are exemplary flowcharts, illustrating how client devices are rerouted to access point radios in a network, and includes a scenario in which new client devices enter the network, consistent with FIGS. 1A-1B, 2A-2G, 3A-3B and 4, according to embodiments described in the present disclosure.

FIG. 5 illustrates a computing component 500 that includes one or more hardware processors 502 and machine-readable storage media 504 storing a set of machine-readable/machine-executable instructions that, when executed, cause the hardware processor(s) 502 to perform an illustrative method of steering client devices to appropriate access point radios in improving 802.11ax capabilities. It should be appreciated that there can be additional, fewer, or alternative steps performed in similar or alternative orders, or in parallel, within the scope of the various embodiments discussed herein unless otherwise stated. The computing component 500 may be implemented as the computing component 111 of FIGS. 1A and 1B. The machine-readable storage media 504 may include suitable machine-readable storage media described in FIG. 6.

At step 506, the hardware processor(s) 502 may execute machine-readable/machine-executable instructions stored in the machine-readable storage media 504 to receive, from access points in a network, data indicating a spatial distribution and 802.11ax capabilities of access point radios and of client devices in a network, as described with reference to FIG. 1B. For example, the data may include a number and/or proportion of 802.11ax client devices associated with each of the access points and access point radios. The data may further include data requirements or predicted data requirements of each of the client devices. For example, the data requirements may be predicted using historical data of data transmission for each respective client device. Next, at step 508, the hardware processor(s) 502 may assign the access point radios as either first access point radios or second access point radios, based on the data. The first access point radios conduct data transmission using an 802.11ax wireless standard and the second access point radios conduct data transmission using legacy wireless standards. In some embodiments, the assignment of the access point radios indicates a preference of a type of client device that connects to the access point radios, as described with reference to FIGS. 2B-2C. For example, the hardware processor(s) 502 may first assign the access points as 802.11ax, legacy, or allow-all using a weighted-sum algorithm, as described with reference to FIG. 2B. In some embodiments, if an access point is assigned as an 802.11ax access point, the hardware processor(s) may further determine which radio or radios on that access point are to be assigned as 802.11ax radios, as described with reference to FIG. 2C. In some embodiments, an access point radio previously assigned as an 802.11ax radio may be reassigned as a legacy radio or an allow-all radio, and vice versa, due to a change in a number and/or a distribution of 802.11ax client devices.

Next, at step 510, the hardware processor(s) 502 may allocate the first access point radios to first channels and the second access point radios to second channels, as described with reference to FIG. 2D. In some embodiments, the first channels may include a first sub-band and the second channels may include a second sub-band of a wireless spectrum. For example, the first channels may occupy an upper sub-band of a 5 GHz spectrum, while the second channels may occupy a lower sub-band of the 5 GHz spectrum, or vice versa. Next, at decision 512, the hardware processor(s) 502 may determine whether any client devices are to be steered to different access points and/or different radios, as described with reference to FIG. 2E. The decision may be based on whether an 802.11ax capability of a client device matches an 802.11ax capability of a radio on which the client device is currently associated or connected. If the 802.11ax capability of a client device fails to match the 802.11ax capability of the currently associated or connected radio, the decision of whether to steer the client device may depend on a distance from the client device to a nearest radio that matches the device's 802.11ax capability, a number of client devices to the nearest matching radio, and/or a predicted number of other client devices to be steered to the nearest matching radio. In step 514, upon the hardware processor(s) 502 determining that a client device is to be steered, the hardware processor(s) 502 may steer the client device to a first access point radio or a second access point radio, depending on the 802.11ax capability of the client device, as described with reference to FIGS. 3A-3B. If the hardware processor(s) 502 determine that no client device is to be steered, the process proceeds to step 516.

In step 516, the hardware processor(s) 502 may detect a new client device that enters the network and 802.11ax capabilities of the new client device. For example, the detection of the new client device may include detecting a MAC (media access control) address of the new client device. The hardware processor(s) 502 may detect which particular access point, and access point radio in the network, that the new client device has associated with, if any. In decision 518, the hardware processor(s) 502 may determine whether the new client device is to be steered to a different access point depending on same or similar considerations in decision 512 above. In some embodiments, if the new client device has not associated with any access point in the network, then the hardware processor(s) 502 may refrain from steering the new client device. In step 520, upon the hardware processor(s) 502 determining that a client device is to be steered, the hardware processor(s) 502 may steer the client device to a first access point radio or a second access point radio, depending on the 802.11ax capability of the client device. If the hardware processor(s) 502 determine that the new client device is not to be steered, the process ends at step 522.

Figure 6:
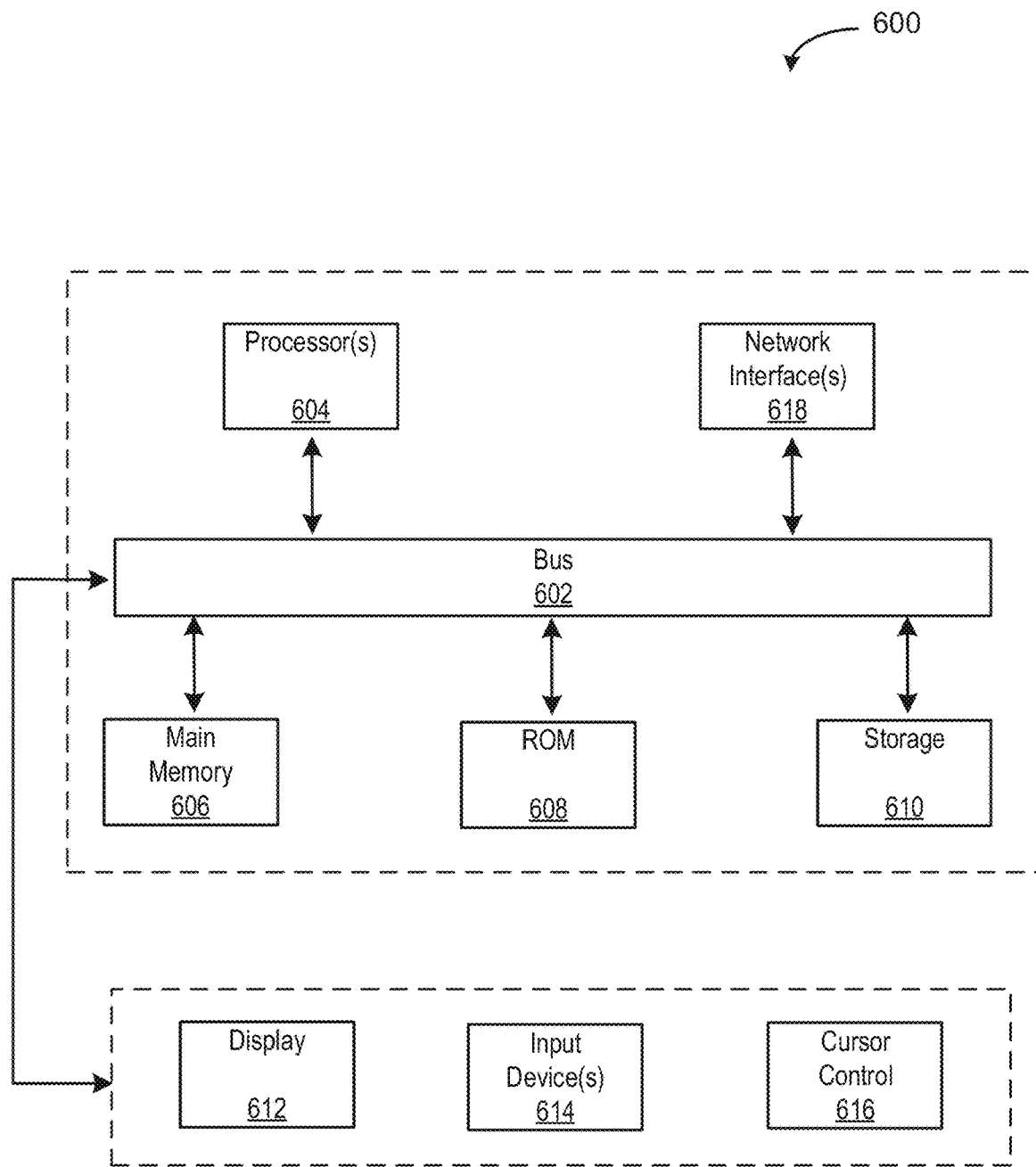
FIG. 6 is an example computing component that may be used to implement various features of embodiments described in the present disclosure.

FIG. 6 depicts a block diagram of an example computer system 600 in which various of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hardwired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618. The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method of a computing system comprising:
   receiving data indicating a spatial distribution and 802.11ax capabilities of access point radios and of client devices in a network;
   assigning the access point radios as either first access point radios or second access point radios, the first access point radios conducting data transmission using an 802.11ax wireless standard and the second access point radios conducting data transmission using legacy wireless standards, based on the data;
   determining whether any of the client devices are to be steered to a different access point radio based on the 802.11ax capabilities of the client devices; and
   in response to determining that a client device is to be steered to a different access point radio, steering the client device to a first access point radio or a second access point radio by:
   determining that the client device that supports the 802.11ax wireless standard is associated with a second access point radio;
   determining that the client device supports 802.11v and requests to transition to a different access point; and
   transmitting, to the client device, through a 802.11v frame, a request to transition to a first access point radio and an indication that the client device will be disassociated from the second access point radio.

2. The computer-implemented method of claim 1, wherein the legacy wireless standards include 802.11a, 802.11b, 802.11g, 802.11n, or 802.11ac wireless standards, while excluding the 802.11ax wireless standard.

3. The computer-implemented method of claim 2, further comprising allocating the first access point radios to a first sub-band and the second access point radios to a second sub-band of a wireless spectrum.

4. The computer-implemented method of claim 1, wherein the assigning of the access point radios includes assigning access points containing the access point radios as either 802.11ax functional or non-802.11ax functional; and
   transmitting, to each access point of the access points, a status indicating whether each respective access point is 802.11ax function.

5. The computer-implemented method of claim 1, wherein the first access point radios and the second access point radios are disposed on a common access point, and further comprising:
   determining whether to allocate an upper sub-band or a lower sub-band of a 5 GHz wireless spectrum to the first access point radios based on a density of second client devices that support the 802.11ax wireless standard and based on occupancies of the upper sub-band and of the lower sub-band.

6. The computer-implemented method of claim 1, further comprising, prior to the assigning, determining that a number of the first access point radios is above a first threshold and a number of the client devices is above a second threshold.

7. The computer-implemented method of claim 1, wherein the spatial distribution of the client devices further includes a density of the client devices averaged over a previous period of time.

8. The computer-implemented method of claim 1, further comprising:
   determining a change in a distribution of client devices that support the 802.11ax wireless standard; and
   reassigning a first access point radio to a second access point radio based on the change.

9. A computing system comprising:
   one or more processors; and
   a memory storing instructions that, when executed by the one or more processors, cause the one or more processors to:
   receive data indicating a spatial distribution and 802.11ax capabilities of access point radios and of client devices in a network;
   assign the access point radios as either first access point radios or second access point radios, the first access point radios conducting data transmission using an 802.11ax wireless standard and the second access point radios conducting data transmission using legacy wireless standards, based on the data;
   determine whether any of the client devices are to be steered to a different access point radio based on the 802.11ax capabilities of the client devices;
   in response to determining that a client device is to be steered to a different access point radio, steer the client device to a first access point radio or a second access point radio;
   detect a new client device entering the network and 802.11ax capabilities of the new client device;
   in response to detecting that the new client device has associated with an access point radio, determine whether the new client device is to be steered to a different access point radio based on the 802.11ax capabilities of the new client device; and
   steer the new client device to the first access point radio or the second access point radio by causing the one or more processors to:
   determine that the client device that supports the 802.11ax wireless standard is associated with a second access point radio;
   determine that the client device supports 802.11v and requests to transition to a different access point; and
   transmit, to the client device, through a 802.11v frame, a request to transition to a first access point radio and an indication that the client device will be disassociated from the second access point radio.

10. The computing system of claim 9, wherein the legacy wireless standards include 802.11a, 802.11b, 802.11g, 802.11n, and 802.11ac wireless standards, while excluding the 802.11ax wireless standard.

11. The computing system of claim 10, wherein the instructions further cause the one or more processors to allocate the first access point radios to the first channels and allocate the second access point radios to the second channels.

12. The computing system of claim 9, wherein the assigning of the access point radios includes assigning access points containing the access point radios as either 802.11ax functional or non-802.11ax functional; and transmitting, to each access point of the access points, a status indicating whether each respective access point is 802.11ax functional.

13. The computing system of claim 9, wherein the first access point radios and the second access point radios are disposed on a common access point, and the instructions further cause the one or more processors to:

determine whether to allocate an upper sub-band or a lower sub-band of a 5 Ghz wireless spectrum to the first access point radios based on a density of second client devices that support the 802.11ax wireless standard and based on occupancies of the upper sub-band and of the lower sub-band.

14. The computing system of claim 9, wherein the instructions further cause the one or more processors to:

prior to the assigning, determine that a number of the first access point radios is above a first threshold and a number of the client devices is above a second threshold.

15. The computing system of claim 9, wherein the spatial distribution of the client devices further includes a density of the client devices averaged over a previous period of time.

16. The computing system of claim 9, wherein the instructions further cause the one or more processors to:

determine a change in a distribution of client devices that support the 802.11ax wireless standard; and reassign a first access point radio as a second access point radio based on the change.

* * * * *